(12) United States Patent
Wagner et al.

(10) Patent No.: US 8,884,789 B2
(45) Date of Patent: Nov. 11, 2014

(54) METHOD AND DEVICE FOR DISPLAYING INFORMATION IN A VEHICLE

(75) Inventors: Volkmar Wagner, Berlin (DE); Indra-Lena Koegler, Berlin (DE); Daniel Canis, Berlin (DE)

(73) Assignee: Volkswagen AG, Wolfsburg (DE)

( * ) Notice: Subject to any disclaimer, the term of this patent is extended or adjusted under 35 U.S.C. 154(b) by 516 days.

(21) Appl. No.: 13/062,685

(22) PCT Filed: Aug. 28, 2009

(86) PCT No.: PCT/EP2009/061134
§ 371 (c)(1),
(2), (4) Date: May 24, 2011

(87) PCT Pub. No.: WO2010/026107
PCT Pub. Date: Mar. 11, 2010

(65) Prior Publication Data
US 2011/0215950 A1    Sep. 8, 2011

(30) Foreign Application Priority Data

Sep. 5, 2008  (DE) .................. 10 2008 045 994.1

(51) Int. Cl.
*G08G 1/123* (2006.01)
*G01C 21/36* (2006.01)

(52) U.S. Cl.
CPC ........ *G01C 21/3632* (2013.01); *G01C 21/3697* (2013.01)
USPC .................................................. 340/995.14

(58) Field of Classification Search
USPC .............. 340/995.14; 345/649; 701/212, 200; 715/764
See application file for complete search history.

(56) References Cited

U.S. PATENT DOCUMENTS

| | | | |
|---|---|---|---|
| 5,289,185 A * | 2/1994 | Ramier et al. ................ | 340/971 |
| 6,674,484 B1 * | 1/2004 | Boland et al. ................ | 348/580 |
| 6,710,774 B1 | 3/2004 | Kawasaki et al. | |
| 7,996,151 B2 * | 8/2011 | Shimamura ................... | 701/423 |
| 2002/0133291 A1 * | 9/2002 | Hamada et al. ............... | 701/208 |
| 2004/0098191 A1 * | 5/2004 | Becker et al. ................ | 701/200 |
| 2004/0204832 A1 * | 10/2004 | Han ............................. | 701/208 |
| 2006/0195257 A1 * | 8/2006 | Nakamura .................... | 701/211 |
| 2007/0050129 A1 * | 3/2007 | Salmre ......................... | 701/207 |
| 2007/0124157 A1 * | 5/2007 | Laumeyer et al. ............ | 705/1 |

(Continued)

FOREIGN PATENT DOCUMENTS

DE       100 23 160       11/2000

OTHER PUBLICATIONS

International Search Report, issued in corresponding International Application No. PCT/EP2009/061134.

*Primary Examiner* — Hai Phan
*Assistant Examiner* — Zhen Y Wu
(74) *Attorney, Agent, or Firm* — Kenyon & Kenyon LLP

(57) ABSTRACT

In a method for displaying information in a vehicle, a geographic map is displayed on a display surface, a symbol for the vehicle is displayed within the geographic map, the position of the symbol relative to the geographic map changing as a function of the geographic position of the vehicle, and a graphic object including supplementary information being displayed within the geographic map as a function of the geographic position of the vehicle. An image sequence including multiple images for the graphic object is produced and displayed as a function of the geographic position of the vehicle such that at the end of the image sequence the graphic object has disappeared or can no longer be assigned to the supplementary information. A device is adapted to implement the method described above.

16 Claims, 2 Drawing Sheets

(56) References Cited

U.S. PATENT DOCUMENTS

| | | | |
|---|---|---|---|
| 2007/0159922 A1* | 7/2007 | Zimmerman et al. | 367/103 |
| 2007/0176794 A1* | 8/2007 | Feyereisen et al. | 340/970 |
| 2008/0167811 A1* | 7/2008 | Geelen | 701/212 |
| 2008/0195315 A1* | 8/2008 | Hu et al. | 701/212 |
| 2009/0005961 A1* | 1/2009 | Grabowski et al. | 701/200 |
| 2009/0177383 A1* | 7/2009 | Tertoolen | 701/208 |
| 2010/0131186 A1* | 5/2010 | Geelen et al. | 701/200 |
| 2011/0179363 A1* | 7/2011 | Dehmann et al. | 715/764 |

* cited by examiner

METHOD AND DEVICE FOR DISPLAYING INFORMATION IN A VEHICLE

FIELD OF THE INVENTION

The present invention relates to a method and device for displaying information in a vehicle.

For example, the present invention relates to a method for displaying information in a vehicle, in which a geographic map is displayed on a display surface, a symbol for the vehicle is displayed within the geographic map, the position of the symbol relative to the geographic map changing as a function of the geographic position of the vehicle, and a graphic object including supplementary information being displayed within the geographic map as a function of the geographic position of the vehicle. The present invention furthermore relates to a device for displaying information in a vehicle having a memory for storing a geographic map and supplementary information, which is assigned to the geographic map and to which graphic objects are assigned, a display device having a display surface for displaying the information, a device for determining the geographic position of the vehicle and a control unit for controlling the information displayed on the display surface, such that within the displayed geographic map a symbol for the vehicle is displayable, the position of which relative to the geographic map is changeable as a function of the geographic position of the vehicle, and that a graphic object including supplementary information is displayable within the geographic map as a function of the geographic position of the vehicle.

BACKGROUND INFORMATION

It is conventional to display a geographic map in a vehicle using a navigation system, in which a vehicle symbol is displayed on the geographic map as a function of the current geographic position of the vehicle such that the observer is able to detect where the vehicle is presently located. In the process, manifold supplementary information may be displayed within the geographic map. For example, the traffic signs assigned to the roads of the geographic map may be indicated on the geographic map by a graphic object. The display of the traffic sign may disappear for example if the displayed map detail has changed such that the position of the graphic object for the traffic sign is no longer within the displayed map detail.

SUMMARY

Example embodiments of the present invention provide a method and a device of the kind mentioned at the outset, in which the display of the graphic object for the supplementary information is improved.

In the method according to example embodiments of the present invention an image sequence including multiple images for the graphic object is produced and displayed as a function of the geographic position of the vehicle such that at the end of the image sequence the graphic object has disappeared or can no longer be assigned to the supplementary information. In the method, the graphic object thus does not disappear from one image to the next, but rather a graphic animation is reproduced for the graphic object, at the end of which the graphic object has disappeared or can no longer be assigned to the supplementary information. In particular, the graphic object can no longer be assigned to the supplementary information if, although a changed graphic object is still represented, it is no longer possible to extract informational content from this object so as to infer supplementary information.

In the method, the vehicle symbol represents in particular the vehicle's direction of travel. The vehicle symbol may be an arrow for example. For example, the graphic object for the supplementary information is represented in front of the vehicle symbol in the direction of travel. The graphic object lies in particular exactly on the axis of travel represented on the geographic map. If a travel route produced by a navigation system is displayed on the geographic map, the graphic symbol for the supplementary information is displayed centrally on the indicated travel route.

According to exemplary embodiments of the method, a perspective rotation of the graphic object is represented in the image sequence. In particular, a perspective rotation of the graphic object about a horizontal axis is represented in the image sequence. For example, the graphic object may be tilted by 90° about its lower edge or an axis through the lowest point of the object such that at the end of the image sequence only a dash for the virtual face of the graphic object is represented, which may finally disappear in the last image of the image sequence.

According to the method, the vehicle symbol and the graphic object are represented during the image sequence such that the graphic object folds over as the vehicle symbol drives over it. The animation produced by the image sequence thus creates the impression for the observer as though the graphic object for the supplementary information were folded over by the movement of the vehicle symbol until it is no longer visible.

According to example embodiments, the rotation of the graphic object is divided into a first phase, in which the pixels of the graphic object are accelerated, and a second phase, in which the pixels of the graphic object are decelerated. In this instance, the first phase corresponds e.g. to an angle of rotation of the graphic object from 0° to 45°, and the second phase corresponds to an angle of rotation of the graphic object from 45° to 90°.

An accelerated movement here should be understood to be a positive acceleration during which the speed increases, and a decelerated movement is understood to be a negative acceleration during which the speed is reduced.

According to example embodiments, the following computing steps are carried out for successive intermediate images for representing the rotation—the successive positions x of the pixels of the graphic object—in the first phase:

$$n = \frac{t - t_0}{d_1}; \quad (i)$$

$$x = b_1 + c_1 \cdot n^4, \quad (ii)$$

where
t is a system time, at which the information is shown on the display surface, where $t = t_0$ at the beginning of the rotation of the first phase,
$d_1$ is the duration of the first phase,
$b_1$ is the starting position of the pixel of the graphic object,
$c_1$ is the total shift of the pixel of the graphic object in the first phase, and steps (i) and (ii) are repeated until: $t > (t_0 + d_1)$ In this instance, parameter x may represent e.g. the vertical position of a point of the graphic object or an angle of rotation.

In addition, the following computing steps are carried out for successive intermediate images for representing the rotation—the successive positions x of the pixels of the object—in the second phase:

$$n = \frac{t - t_0}{d_2} - 1; \quad \text{(i)}$$

$$x = b_2 + c_2 \cdot (1 - n^4), \quad \text{(ii)}$$

where
t is a system time, at which the information is shown on the display surface, where $t=t_0$ at the beginning of the rotation of the second phase,
$d_2$ is the duration of the second phase,
$b_2$ is the starting position of the pixel of the object,
$c_2$ is the total shift of the pixel of the object in the second phase and
steps (i) and (ii) are repeated by the computing unit until: $t > (t_0 + d_2)$.

According to example embodiments, the speed of the vehicle is measured, and the duration of the total rotation or the duration of the rotation of the first and/or second phase is ascertained as a function of the speed of the vehicle. By preference, the higher the speed of the motor vehicle, the longer the duration of the rotation. For, at higher speeds, the driver can direct his eye toward the display only for shorter time intervals. Moreover, the spacing of the time intervals in which the driver directs his eye toward the display is greater, since at higher speeds, the driver must focus greater attention on the driving process. The coupling of the rotational duration of the two-dimensional object to the speed of the motor vehicle therefore ensures that at higher speeds, the driver retains the orientation in the information display, and in this manner, is able to comprehend the informational contents easily, quickly and intuitively.

According to exemplary embodiments, the image sequence causes the graphic object to fade out. In this instance, particularly the transparency of the graphic object is increased, the closer the vehicle symbol is represented to the graphic object on the display surface. The computation of the parameter for the transparency may occur in the same manner as the previously described computation of the position x of the pixels of the graphic object in the rotation. The transparency changes in the process from 0% to 100% such that at the end of the image sequence the graphic object has disappeared completely.

According to example embodiments, a traffic sign is represented as the graphic object. The supplementary information thus relates to the informational content of the represented traffic sign. For this purpose, the graphic object for the traffic sign is displayed on the geographic map before it is applicable to the vehicle. As in reality, the observer is thus able to perceive the graphic object for the traffic sign before it becomes applicable. For this purpose, as in reality, the graphic object for the traffic sign may be represented at the position on the geographic map at which it becomes applicable.

The geographic map may be represented two-dimensionally on the display surface. The image sequence, by contrast, may represent a three-dimensional perspective change of the graphic object. Furthermore, the geographic map may be represented in three-dimensional perspective. A bird's-eye perspective may be represented for example. In this case as well, the image sequence may represent a three-dimensional perspective change of the graphic object.

In a device according to example embodiments of the present invention for displaying information in a vehicle, the control unit is able to produce, as a function of the geographic position of the vehicle, an image sequence for display on the display surface, which comprises multiple images for the graphic object such that the graphic object has disappeared by the end of the image sequence or it can no longer being assigned to the supplementary information. The control unit is arranged in particular so that the method steps described above may be performed in part or entirely. In particular, the control unit is able to produce graphic data and transmit these to the display device, which graphic data represent the image sequence for the graphic object produced on the display device.

Example embodiments of the present invention are explained in greater detail with reference to the Figures.

DETAILED DESCRIPTION

Figure 1:
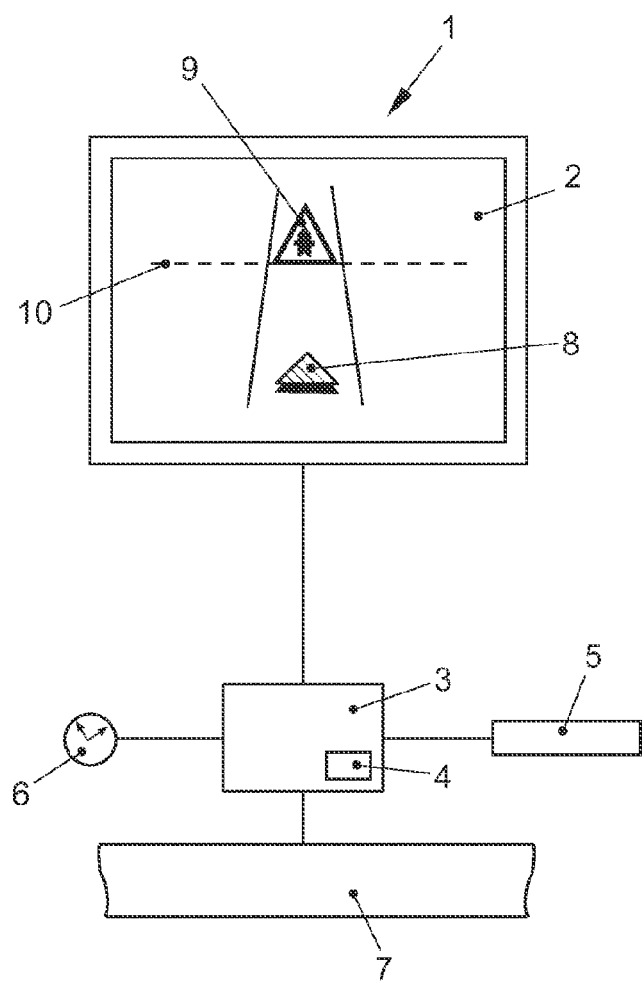
FIG. 1 shows a schematic representation of a device according to an example embodiments of the present invention and its coupling to additional devices of the vehicle.

The device according to an example embodiment of the present invention includes a display device 1 having a display surface 2 for representing information. Display surface 2 may be a display of any type of construction. It may be a liquid crystal display for example, in particular a color display using TFT (thin film resistor) technology. The display on display surface 2 is freely programmable, i.e. arbitrary graphic data may be produced, which are represented on display surface 2.

Display surface 2 of display device 1 is fastened in an area of the vehicle that is readily visible at least for the driver. For example, display surface 2 may be part of the so-called instrument cluster of the vehicle, which is situated directly in the driver's field of vision.

Display device 1 is connected to a control unit 3. Control unit 3 in turn is connected to a memory 5. Memory 5 stores in particular the data associated with a geographic map. Furthermore, memory 5 stores data for supplementary information associated with the geographic map. For example, a specific geographic position on the geographic map may be assigned to the supplementary information. The supplementary information in turn has graphic objects assigned to it, by which the supplementary information may be represented within the geographic map. Control unit 3 is able to produce graphic data for representing a detail of the geographic map in combination with graphic objects for the supplementary information. These graphic data are displayed by display device 1 via display surface 2.

Control unit 3 is furthermore coupled with a system clock 6 and with a vehicle bus 7. Data of a speedometer of the vehicle are transmitted via vehicle bus 7 to control unit 3.

Furthermore, control unit 3 is connected via vehicle bus 7 to driver assistance systems of the vehicle. These driver assistance systems may include in particular a navigation system, the display of which may be displayed by display surface 2. Via vehicle bus 7, control unit 3 may furthermore be coupled with a device for determining the geographic position of the vehicle. This device may contain for example a receiver for data, which are emitted by satellites for positioning. The devices described above may also be part of a navigation system.

In the following, a first example for an informational display in a vehicle on display surface 2 will be explained in detail with reference to FIGS. 1 through 4.

Figure 2:
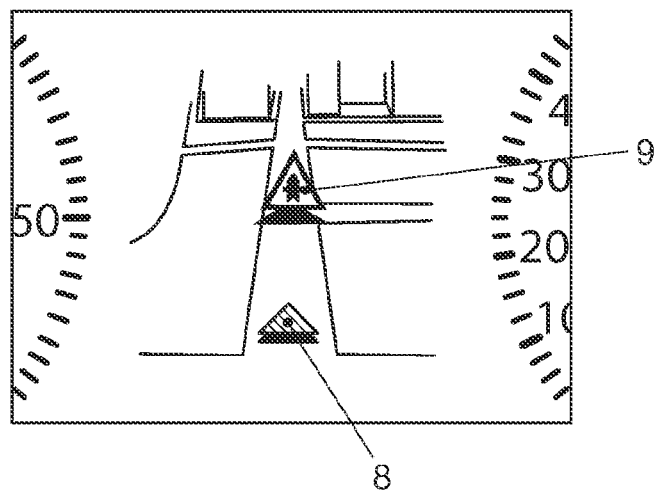
FIGS. 2-4 show a display on the display surface that is produced from a method according to an example embodiment of the present invention.

As shown in FIG. 2, display surface 2 in an instrument cluster of the vehicle shows a detail of a road map. In particular, a road intersection is represented in perspective as viewed at an angle from above. The current position of the host vehicle relative to the road map is represented by a symbol 8, which also indicates the direction of travel of the vehicle.

In the display shown in FIG. 2, vehicle symbol 8 approaches an intersection or junction. This junction has a traffic sign assigned to it, namely, a yield sign. This supplementary information to the road map is stored in memory 5. At a specific distance of the vehicle from the junction, control unit 3 produces graphic data, which represent a graphic object 9 that symbolically represents the traffic sign. The time of the appearance of graphic object 9 for the traffic sign is different than the time at which or starting at which the traffic sign becomes applicable. As in reality, graphic object 9 for the traffic sign becomes visible before the traffic sign is reached.

The graphic object 9 for the traffic sign is represented exactly in the axis of travel of the symbol 8 for the vehicle, as shown in FIG. 2. If additionally a travel route of the navigation system is indicated on the map, then the graphic object 9 for the traffic sign is shown centrally on the indicated travel route.

Figure 3:
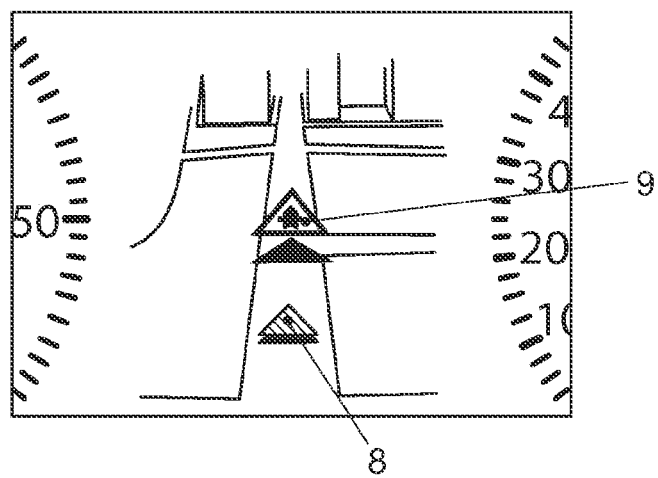
Figure 4:
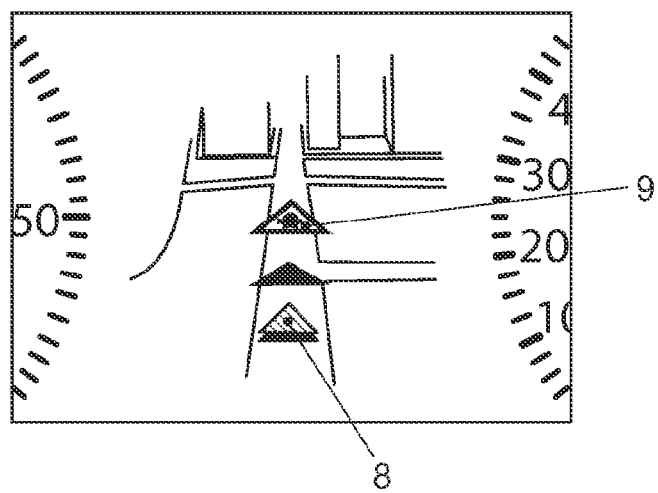

The additional FIGS. 3 and 4 show how the display changes as vehicle symbol 8 continues to approach the graphic object 9 for the traffic sign, i.e. as the vehicle in reality approaches the junction. In this case, the control unit produces an image sequence of a plurality of images, in which the representation of graphic object 9 is changed. For this purpose, graphic object 9 is shown in perspective in such a way that it is turned in perspective backward by 90° about the horizontal axis 10 (FIG. 1) until only the virtual face of object 9 is displayed as a dash that finally disappears at the end of the image sequence such that graphic object 9 has disappeared at the end of the image sequence. The image sequence thus results in an animation of graphic object 9, in which the impression is created that vehicle symbol 8 drives over graphic object 9, whereby graphic object 9 is folded backward. The end of the image sequence is reached at least when the position of vehicle symbol 8 on the map has reached the position of the graphic object 9 for the traffic sign on display surface 2. FIGS. 2 through 4 show three images of the image sequence, which contains however a much greater number of intermediate images, which result in an animation of the rotational motion of graphic object 9.

The following describes in detail how graphic object 9 is rotated with respect to time:

The rotation of graphic object 9 is divided into two phases. In the first phase, object 9 is rotated by 45° from an initial position shown in FIG. 2 to a neutral position. In a second phase, the graphic object is rotated further to an angle of rotation of 90° such that only the virtual lateral face of graphic object 9 is still visible. The perspective representation of the rotation occurs in such a way that the observer looks directly onto graphic object 9, i.e. the direction of observation for the perspective representation runs parallel to the normal of display surface 2.

The following describes the parameterization of the rotational motion on the basis of position x, which represents for example the distance of a pixel of object 9 from axis of rotation 10 in the vertical direction.

The rotation of graphic object 9 is represented by successive intermediate images, which indicate successive positions of the pixels of graphic object 9. In computing the graphic data for these positions x, the following computing steps are performed in the first phase:

$$n = \frac{t - t_0}{d_1}; \quad (i)$$

$$x = b_1 + c_1 \cdot n^4, \quad (ii)$$

where t is a system time, at which the information is shown on display surface 2, where $t=t_0$ at the beginning of the rotation of the first phase, $d_1$ is the duration of the first phase, $b_1$ is the starting position of the pixel of graphic object 9, $c_1$ is the total shift of the pixel of graphic object 9 in the first phase, and steps (i) and (ii) are repeated until $t>(t_0+d_1)$ For the second phase, the following computing steps are carried out:

$$n = \frac{t - t_0}{d_2} - 1; \quad (i)$$

$$x = b_2 + c_2 \cdot (1 - n^4), \quad (ii)$$

where t is a system time, at which the information is shown on display surface 2, where $t=t_0$ at the beginning of the rotation of the second phase, $d_2$ is the duration of the second phase, $b_2$ is the starting position of the pixel of graphic object 9, $c_2$ is the total shift of the pixel of graphic object 9 in the second phase and steps (i) and (ii) are repeated until: $t>(t_0+d_2)$.

The computing steps are performed by a computing unit 4 of control unit 3, system clock 6 transmitting system time t to computing unit 4.

Duration $d_1$ of the rotation of the first phase is in a range from 0.25 seconds to 1 second, in particular in a range from 0.6 seconds to 0.8 seconds. In the same way, the duration of the rotation of the second phase is in a range from 0.25 seconds to 1 second, in particular in a range from 0.6 seconds to 0.8 seconds.

According to exemplary embodiments, the data of the speedometer of the vehicle are transmitted to control unit 3 and thus computing unit 4 via vehicle bus 7. These data are used by computing unit 4 to ascertain the duration of rotation for the two phases. The higher the speed of the vehicle, the longer the duration of the total rotation.

In another example, graphic object 9 is not rotated, but rather the image sequence fades out graphic object 9 in that the transparency of graphic object 9 is increased in the course of the image sequence until graphic object 9 has disappeared completely. For this purpose, the transparency is progressively increased as vehicle symbol 8 is represented as being closer to graphic object 9 on display surface 2. The manner in which the transparency is increased corresponds to the manner in which graphic object 9 was rotated in the first example. The graphic object has disappeared entirely in particular when vehicle symbol 8 has reached the position of graphic object 9 so that there occurs no superposition of the representation of vehicle symbol 8 and graphic object 9, in which object 9 possibly covers vehicle symbol 8.

LIST OF REFERENCE NUMERALS 1 display device
2 display surface
3 control unit
4 computing unit
5 memory
6 system clock
7 vehicle bus
8 vehicle symbol
9 graphic object
10 horizontal axis

The invention claimed is:

1. A method for displaying information in a vehicle, comprising:
   displaying a geographic map on a display surface;
   displaying a symbol for the vehicle within the geographic map, a position of the symbol relative to the geographic map changing as a function of a geographic position of the vehicle;
   displaying a graphic object including supplementary information within the geographic map as a function of the geographic position of the vehicle; and
   producing and displaying an image sequence, including multiple images for the graphic object, wherein the graphic object rotates as a function of the distance between the symbol for the vehicle and the graphic object, such that at an end of the image sequence the graphic object at least one of (a) has disappeared or (b) is no longer assignable to the supplementary information.

2. The method according to claim 1, wherein the vehicle symbol represents a direction of travel of the vehicle and the graphic object is shown in front of the vehicle symbol in the direction of travel.

3. The method according to claim 1, wherein a perspective rotation of the graphic object is shown in the image sequence.

4. The method according to claim 3, wherein a perspective rotation of the graphic object about a horizontal axis is shown in the image sequence.

5. The method according to claim 4, wherein in the course of the image sequence the vehicle symbol and the graphic object are shown so as to represent the graphic object as folding over as the vehicle symbol drives over it.

6. The method according to claim 3, wherein the rotation is divided into a first phase, in which pixels of the graphic object are moved in accelerated fashion, and a second phase, in which the pixels of the graphic object are moved in a decelerated fashion.

7. The method according to claim 6, further comprising:
   measuring a speed of the vehicle; and
   ascertaining at least one of (a) a duration of a total rotation or (b) a duration of the rotation of at least one of (i) the first phase or (ii) the second phase as a function of the speed of the vehicle.

8. The method according to claim 1, wherein the image sequence produces a representation of the graphic object as fading out.

9. The method according to claim 8, wherein a transparency of the graphic object is increased, the closer the vehicle symbol is represented as being to the graphic object on the display surface.

10. The method according to claim 1, wherein the graphic object includes a traffic sign.

11. The method according to claim 1, further comprising:
    determining when the geographic position of the vehicle is expected to correspond to the position on the display surface, at which the graphic object is represented; and
    substantially ending the image sequence when the expected geographic position of the vehicle corresponds to the position on the display surface, at which the graphic object is represented.

12. A method for displaying information in a vehicle, comprising:
    displaying a geographic map on a display surface;
    displaying a symbol for the vehicle within the geographic map, a position of the symbol relative to the geographic map changing as a function of a geographic position of the vehicle;
    displaying a graphic object including supplementary information within the geographic map as a function of the geographic position of the vehicle; and
    producing and displaying an image sequence, including multiple images for the graphic object, as a function of the geographic position of the vehicle such that at an end of the image sequence the graphic object at least one of (a) has disappeared or (b) is no longer assignable to the supplementary information;
    wherein a perspective rotation of the graphic object is shown in the image sequence;
    wherein the rotation is divided into a first phase, in which pixels of the graphic object are moved in accelerated fashion, and a second phase, in which the pixels of the graphic object are moved in a decelerated fashion; and
    further comprising, for successive intermediate images for representing the rotation in the first phase, repeatedly determining:

$$n = \frac{t - t_0}{d_1}; \text{ and} \qquad (i)$$

$$x = b_1 + c_1 \cdot n^4, \qquad (ii)$$
$$\text{until } t > (t_0 + d_1),$$

wherein:
   n represents a ratio of time periods;
   x represents a position of the pixels of the graphic object;
   t represents a system time at which the information is shown on the display surface, $t=t_0$ at a beginning of the rotation of the first phase;
   $d_1$ represents a duration of the first phase;
   $b_1$ represents a starting position of a pixel of the graphic object; and
   $c_1$ represents a total shift of the pixel of the graphic object.

13. A method for displaying information in a vehicle, comprising:
    displaying a geographic map on a display surface;
    displaying a symbol for the vehicle within the geographic map, a position of the symbol relative to the geographic map changing as a function of a geographic position of the vehicle;
    displaying a graphic object including supplementary information within the geographic map as a function of the geographic position of the vehicle; and
    producing and displaying an image sequence, including multiple images for the graphic object, as a function of the geographic position of the vehicle such that at an end of the image sequence the graphic object at least one of (a) has disappeared or (b) is no longer assignable to the supplementary information;
    wherein a perspective rotation of the graphic object is shown in the image sequence;
    wherein the rotation is divided into a first phase, in which pixels of the graphic object are moved in accelerated fashion, and a second phase, in which the pixels of the graphic object are moved in a decelerated fashion; and further comprising, for successive intermediate images for representing the rotation in the second phase, repeatedly determining:

$$n = \frac{t - t_0}{d_2} - 1; \text{ and} \quad (i)$$

$$x = b_2 + c_2 \cdot (1 - n^4), \quad (ii)$$

until $t > (t_0 + d_2)$, wherein:
n represents a ratio of time periods;
x represents a position of the pixels of the graphic object;
t represents a system time at which the information is shown on the display surface, $t=t_0$ at a beginning of the rotation of the second phase;
$d_2$ represents a duration of the first phase;
$b_2$ represents a starting position of a pixel of the graphic object; and
$c_2$ represents a total shift of the pixel of the graphic object in the second phase.

14. A device for displaying information in a vehicle, comprising:
a memory adapted to store a geographic map and supplementary information assigned to the geographic map and to which graphic objects are assigned;
a display device including a display surface adapted to display the information;
a position determination device adapted to determine a geographic position of the vehicle; and
a control unit adapted to control information displayed on the display surface such that within a displayed geographic map a symbol for the vehicle is displayable, a position of the symbol for the vehicle relative to the geographic map changeable as a function of the geographic position of the vehicle, and a graphic object including supplementary information is displayable within the geographic map as a function of the geographic position of the vehicle;
wherein the control unit is adapted to produce an image sequence for display on the display surface, wherein the graphic object rotates as a function of the distance between the symbol for the vehicle and the graphic object, the image sequence including multiple images for the graphic object, the graphic object at least one of (a) having disappeared at an end of the image sequence or (b) no longer assignable to the supplementary information.

15. The device according to claim 14, wherein the device is adapted to perform the method recited in claim 1.

16. The method according to claim 1, wherein the method is performed by the device recited in claim 14.

* * * * *